United States Patent [19]

Winter et al.

[11] Patent Number: 4,962,248

[45] Date of Patent: Oct. 9, 1990

[54] 1-OLEFIN STEREOBLOCK POLYMER WAX, AND A PROCESS FOR THE PREPARATION THEREOF

[75] Inventors: Andreas Winter, Kelkheim; Martin Antberg, Hofheim am Taunus; Jürgen Rohrmann, Neufahrn, all of Fed. Rep. of Germany

[73] Assignee: Hoechst Aktiengesellschaft, Frankfurt am Main, Fed. Rep. of Germany

[21] Appl. No.: 286,451

[22] Filed: Dec. 19, 1988

[30] Foreign Application Priority Data

Dec. 21, 1987 [DE] Fed. Rep. of Germany ....... 3743320

[51] Int. Cl.$^5$ .............................................. C08F 4/42
[52] U.S. Cl. ....................................... 585/12; 585/10; 585/18; 585/512; 585/946; 526/153; 526/160
[58] Field of Search ..................... 585/10, 12, 946, 18, 585/512; 526/153, 160

[56] References Cited

U.S. PATENT DOCUMENTS

| | | | |
|---|---|---|---|
| 4,522,982 | 6/1985 | Ewen | 525/240 |
| 4,704,491 | 11/1987 | Tsutsui et al. | 585/10 |
| 4,769,510 | 9/1988 | Kaminsky et al. | 585/512 |
| 4,794,096 | 12/1988 | Ewen | 502/117 |
| 4,814,546 | 3/1989 | Watanabe et al. | 585/523 |

FOREIGN PATENT DOCUMENTS

| | | |
|---|---|---|
| 0185918 | 7/1986 | European Pat. Off. |
| 3148229 | 6/1983 | Fed. Rep. of Germany |
| 59-206409 | 11/1984 | Japan |

*Primary Examiner*—Asok Pal

[57] ABSTRACT

1-Olefin stereoblock polymer waxes having a very narrow molecular weight distribution are obtained by means of a catalyst which comprises a metallocene compound containing cyclopentadienyl radicals substituted by chiral groups, and an aluminoxane, in the presence of small amounts of hydrogen during the polymerization.

5 Claims, No Drawings

1-OLEFIN STEREOBLOCK POLYMER WAX, AND A PROCESS FOR THE PREPARATION THEREOF

The invention relates to 1-olefin stereoblock polymer waxes having a narrow molecular weight distribution $M_w/M_n$, and to a process for the preparation thereof.

Stereoblock polymers are homopolymers in whose molecular chains isotactic sequences having an opposed configuration alternate with one another.

A process is known for the preparation of polypropylene which has a block-like structure and in which the isotactic sequences are 2 to 17 monomer units long (cf. U.S. Pat. No. 4,522,982). The catalyst employed is a metallocene of a metal from group 4b, 5b or 6b of the Periodic Table, for example titanium, vanadium or hafnium, in particular titanium. This metallocene is a mono-, di- or tricyclopentadienyl or substituted cyclopentadienyl metal compound. The cocatalyst employed is an aluminoxane.

However, the titanocenes preferably used are not of sufficient thermostability in dilute solution to be used in an industrial process. Finally, the cocatalysts must be employed in a comparatively high concentration in order to achieve an adequate catalyst yield, which has the result that the catalyst residues present in the polymer product have to be removed in a separate purification step.

The preparation of high-isotacticity polyolefin waxes (Isotactic Index 80–85%, melt enthalpy 63 J/g, mixtures of atactic and isotactic polyolefin chains) by means of supported catalyst, cocatalyst and stereoregulator at temperatures of greater than 95° C. is known (cf, De-A No. 3,148,229). However, it is necessary to employ large amounts of hydrogen as molecular weight regulator since catalyst systems of this type develop their greatest activity in the area of high-molecular-weight polyolefin plastics. In order to achieve the degrees of polymerization which are typical of waxes, propylene: hydrogen partial pressure ratios of <1 are required.

It is known that hydrogenation of propylene to propane occurs to a significant extent under such reaction conditions and thus results in considerable loss of propylene. The low catalyst activities which are achieved under these reaction conditions result in high residual ash contents and, in particular, extremely high chlorine contents in the wax products, and require complex purification steps for removal.

Furthermore, an $MgCl_2$-supported catalyst is known which results in crystalline PP waxes having a narrow molecular weight distribution (JP 59/206,409). However, this catalyst likewise has the disadvantage of a poor response to hydrogen, and very large amounts of hydrogen are necessary for molecular weight regulation. This results in a poor space-time yield and comparatively low activity. In addition, relatively high chlorine contents of, in some cases, greater than 1,000 ppm are found in the polymer waxes if the catalyst residues are not removed by specific aftertreatment. Here too, the high hydrogen partial pressures result in significant hydrogenation of propylene to propane and thus in considerable loss of propylene.

A specific pre-activation method of metallocene using an aluminoxane has also been proposed; this results in a considerable increase in the activity of the catalyst system and in a significant improvement in the grain morphology of the polymer (cf. DE No. 3,726,067).

In addition, it has been proposed to use a metallocene having several centers of chirality for the preparation of 1-olefin stereoblock polymers (cf. DE No. 3,640,948).

It is furthermore known from the literature that the molecular weight of polyolefins prepared using metallocene/aluminoxane can be controlled via the polymerization temperature. Specifically, a high polymerization temperature results in a low molecular weight. Experiments have now shown that, in the case of metallocene/aluminoxane catalysts, the temperature range available in industry is not sufficient to include and cover the important molecular weight range for wax types.

A further disadvantage in using polyolefins prepared by means of metallocene/aluminoxane systems is the fact that the chain ends produced on chain termination always contain an unsaturated group.

It is known from the literature that organometallic compounds, such as, for example, $AlR_3$ or $ZnR_2$, are capable of initiating chain-termination reactions, even in combination with metallocene/aluminoxane systems. However, experiments have shown that the catalyst activities usually fall drastically and, in addition, the undesired residual ash content in the wax increases greatly due to the necessary addition of relatively large amounts of these molecular weight regulators. Only $AlMe_3$ allows the catalyst activity to increase, but the action as a molecular weight regulator is unsatisfactory and the necessary use of large amounts likewise results in an increase in the residual ash content in the polymer.

The object was to find a process using which polyolefin waxes containing saturated chain ends can be prepared in direct synthesis using metallocene/aluminoxane catalysts.

It has been found that the object can be achieved when hydrogen is used as the molecular weight regulator. The metallocenes used have a surprisingly high sensitivity for hydrogen, which means that waxes can be produced using small amounts of hydrogen.

The invention thus relates to a stereoblock polymer wax comprising units derived from a 1-olefin of the formula $RCH=CH_2$ in which R denotes an alkyl radical having 1 to 28 carbon atoms, with alternating isotactic sequences of opposed configuration and having a length of 3 or more monomer units in the molecular chain, having a molecular weight distribution $M_w/M_n$ of from 1.8 to 3.0 and having a viscosity number of from 2 to 60 $cm^3/g$.

The invention furthermore relates to a process for the preparation of a 1-olefin stereoblock polymer wax by polymerization of a 1-olefin of the formula $R—CH=CH_2$ in which R is an alkyl radical having 1 to 28 carbon atoms, in one or more steps at a temperature of from −50° to 200° C., at a pressure of from 0.5 to 120 bar, in solution, in suspension or in the gas phase, in the presence of a catalyst comprising a transition metal compound and an aluminoxane, which comprises carrying out the polymerization in the presence of a catalyst whose transition metal compound is a metallocene compound of the formula I

in which

R¹ and R² are identical or different and denote a halogen atom, $C_1$-$C_{10}$-alkyl, $C_6$-$C_{10}$-aryl, $C_2$-$C_{10}$-alkenyl $C_7$-$C_{40}$-arylalkyl, $C_7$-$C_{40}$-alkylaryl or $C_8$-$C_{40}$-alkenylaryl R³ and R⁴ are identical or different and denote a substituted cyclopentadienyl radical, where this radical contains one or more centers of chirality and has been produced by reacting an alkali metal cyclopentadienide with a chiral alcohol, and Me is titanium, zirconium or hafnium, and has been pre-activated before the polymerization using an aluminoxane of the formula II

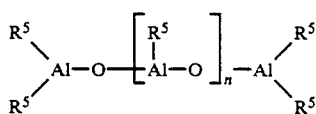  (II)

for the linear type and/or one of the formula III

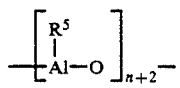  (III)

for the cyclic type, where, in the formulae II and III, R⁵ denotes methyl, ethyl or isobutyl, and n is an integer from 5 to 40, for 5 minutes to 60 minutes at a temperature of from $-78°$ to $100°$ C., and the activator is likewise an aluminoxane of the formulae II or III, and hydrogen is present in the 1-olefin:$H_2$ molar ratio of from 3 to 3,000.

To prepare the stereoblock polymer wax according to the invention, a metallocene of the formula (I) is employed:

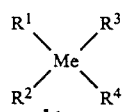  (I)

In this formula, Me is titanium, zirconium or hafnium.
R¹ and R² are identical or different and denote a halogen atom, $C_1$-$C_{10}$-alkyl, $C_6$-$C_{10}$-aryl, $C_2$-$C_{10}$-alkenyl, $C_7$-$C_{40}$-arylalkyl, $C_7$-$C_{40}$-alkylaryl or $C_8$-$C_{40}$-alkenylaryl.
R³ and R⁴ are identical or different and denote a substituted cyclopentadienyl radical, where this radical contains one or more centers of chirality and has been produced by reacting an alkali metal cyclopentadienide with a chiral alcohol.
R³ and R⁴ may also be connected by a $C_1$-$C_2$-alkylene bridge or an $R_2^6Si$ bridge. R⁶ denotes $C_1$-$C_{10}$-alkyl, $C_6$-$C_{10}$-aryl, $C_2$-$C_{10}$-alkenyl, $C_7$-$C_{40}$-arylalkyl, $C_7C_{40}$-alkylaryl or $C_8$-$C_{40}$-alkenylaryl.

In the formula I, Me is preferably zirconium or hafnium, and R¹ and R² preferably denote a halogen atom or an alkyl group, preferably methyl, in particular a chlorine atom. R³ and R⁴ have been produced by reacting an alkali metal cyclopentadienide, preferably sodium cyclopentadienide, and, for example, one of the following chiral alcohols:

thujyl alcohol; neothujyl alcohol; cis- and trans-sabinol; 2,5-dimethyl-4-vinyl-2,5-hexadien-1-ol; lavandulol; iso-pulegol; neoisopulegol; cis- and trans-pulegol; isomenthol, neomenthol; neoisomenthol; menthol; cis- and trans-$\Delta^1(7)$-p-menthen-2-ol; cis- and trans-$\Delta^1(7)$8-p-menthadien-2-ol; dihydrocarveol; neodihydrocarveol; isodihydrocarbeol; neoisodihydrocarveol; carvomenthol; neoisocarvomenthol; isocarvomenthol; neocarvomenthol; perilla alcohol; phellandrol; butan-2-ol; cycloisolongifolol; isolongifolol; 2-methylbutanol; octan-2-ol; pentan-2-ol; phenylethanol; hydroxycitronellal; hydroxycitronellol; cis- and trans-myrtenol; 2,6-dimethyloct-3-ene-2,8-diol; 2,6-dimethyloct-1-ene-3,8-diol; dihydrocitronellol; citronellol; 2,6-dimethylocta-2,7-dien-4-ol; 2,6-dimethylocta-1,7-dien-3-ol; $\Delta^{1,8}$-p-menthadien-9-ol; $\Delta^1$-p-menthen-9-ol; cis- and trans-sobrerol; cis-m-menthan-5-l, $\Delta^{4/10}$-caren-5-ol; $\Delta^3$-caren-2-ol; caran-3-ol; isocaran-3ol; neocaran-3-ol; neoisocaran-3-ol; $\alpha,\beta$-fenchol; borneol; isoborneol; cis- and trans-myrtanol; neoverbanol; neoisoverbanol; cis- and trans-chrysanthenol; cis- and trans-verbenol; isoverbanol; cis- and transpinocarveol; pinocampheol; neopinocampheol; isopinocampheol; neoisopinocampheol and methylnopinol.

Of these chiral alcohols, the cyclic ones are preferably applied. Neomenthol is particularly preferred. The metallocene compound preferably used is thus bis(-neomenthylcyclopentadienyl)zirconium dichloride, bis(neoisomenthyicyclopentadienyl)zirconium dichloride or bis(cis-myrtanylcyclopentadienyl)zirconium dichloride, particularly preferably bis(neomenthylcyclopentadienyl)-zirconium dichloride.

These compounds can be prepared, for example, in the following manner:

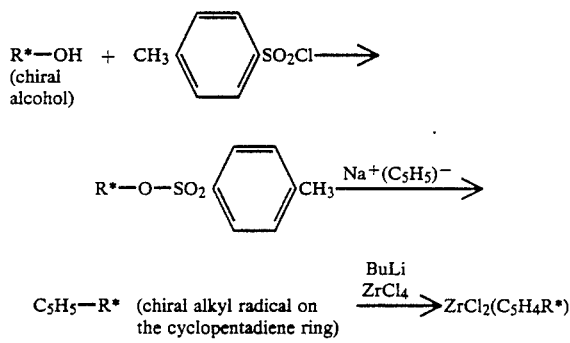

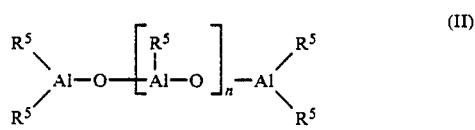

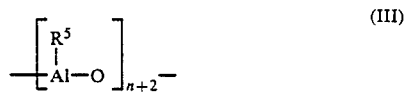

Before use in the polymerization reaction, the metallocene is pre-activated using an aluminoxane. This aluminoxane is a compound of the formula II

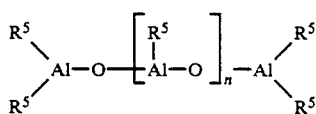  (II)

for the linear type and/or of the formula III

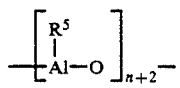  (III)

for the cyclic type. In these formulae, R⁵ denotes a $C_1$-$C_6$-alkyl group, preferably methyl, ethyl or isobutyl, in particular methyl, and n denotes an integer from 5 to 40, preferably 15 to 35.

The aluminoxane can be prepared in various ways.

In one of the processes, finely powdered copper sulfate pentahydrate is slurried in toluene, and sufficient trialkylaluminum is added in a glass flask under an inert gas at about −20° C. such that about 1 mole of CuSO$_4$.5H$_2$O is available for each 4 Al atoms. After slow hydrolysis with elimination of alkane, the reaction mixture is left at room temperature for 24 to 48 hours, cooling sometimes being necessary so that the temperature does not exceed 30° C. The aluminoxane dissolved in toluene is subsequently separated from the copper sulfate by filtration, and the toluene is removed by distillation in vacuo. It is assumed that the low-molecular-weight aluminoxanes condense in this preparation process to form higher oligomers with elimination of trialkylaluminum.

In addition, aluminoxanes are obtained when trialkylaluminum, preferably trimethylaluminum, dissolved in an inert aliphatic or aromatic solvent, preferably heptane or toluene, is reacted at a temperature of −20° to 100° C. with aluminum salts containing water of crystallization, preferably aluminum sulfate. In this case, the volume ratio between the solvent and the alkylaluminum used is 1:1 to 50:1 —preferably 5:1—and the reaction time which can be monitored by elimination of the alkane, is 1 to 200 hours—preferably 10 to 40 hours.

Of the aluminum salts containing water of crystallization, those are used, in particular, which have a high content of water of crystallization. Aluminum sulfate hydrate is particularly preferred, above all the compounds Al$_2$(SO$_4$)$_3$.18H$_2$O and Al$_2$(SO$_4$)$_3$.16H$_2$O having the particularly high water of crystallization content of 18 and 16 moles of H$_2$O/mole of Al$_2$(SO$_4$)$_3$ respectively.

The pre-activation is carried out in solution, with the metallocene preferably being dissolved in a solution of the aluminoxane in an inert hydrocarbon. Suitable inert hydrocarbons are aliphatic and aromatic hydrocarbons. Toluene is preferably used.

The concentration of the aluminoxane in the solution is in the range from about 1% by weight to the saturation limit, preferably from 5 to 30% by weight, in each case based on the total solution. The metallocene can be employed in the same concentration, but is preferably employed in an amount of from $10^{-4}-1$ mole per mole of aluminoxane. The pre-activation time is 5 minutes to 60 minutes, preferably 10–20 minutes.

Significantly longer pre-activation is possible, but normally neither increases the activity nor decreases the activity and has no effect, in particular, on the molecular weight of the polyolefin wax produced, but may be thoroughly appropriate for storage purposes. The preactivation is carried out at a temperature of from −78° to 100° C., preferably 0° to 70° C.

The pre-activation can be carried out either with exclusion of light or under the action of light since the metallocenes, which are generally photosensitive, are stabilized by the aluminoxane. It is nevertheless preferred to exclude direct incidence of light, particularly at relatively long pre-activation times and in the case of particularly sensitive metallocenes.

The second component of the catalyst to be used according to the invention is an aluminoxane of the formula (II) and/or (III). Preferably, the same aluminoxane is used for pre-activation and for polymerization.

The catalyst to be used according to the invention is employed for polymerization of 1-olefins of the formula R—CH=CH$_2$ in which R denotes an alkyl radical having 1 to 28 carbon atoms, preferably 1 to 10 carbon atoms, in particular one carbon atom, for example propylene, 1-butene, 1-hexene, 4-methyl-1-pentene and 1-octene. Propylene is particularly preferred. Furthermore, the catalyst is also employed for copolymerization of these olefins with one another and with ethylene, it being possible to copolymerize more than 50% by weight of ethylene.

The polymerization is carried out in a known manner in liquid monomers, in solution, in suspension or in the gas phase, continuously or batchwise, in one or more steps, at a temperature of −50° to 200° C., preferably −20 to 120, in particular −20° to 80° C.

Hydrogen is added as a molecular weight regulator. The hydrogen partial pressure in this case is between 0.05 and 50 bar, preferably 0.1 to 25 bar, in particular 0.5 to 10 bar.

The 1-olefin:hydrogen molar ratio is thus 3 to 3,000, preferably 6 to 1,500, in particular 15 to 300.

The overall pressure in the polymerization system is thus 0.5 to 120 bar. Polymerization in the pressure range from 5 to 100 bar, which is particularly interesting in industry, is preferred.

The metallocene compound is used in a concentration, based on the transition metal, of from $10^{-3}$ to $10^{-7}$, preferably $10^{-4}$ to $10^{-6}$, mole of transition metal per dm$^3$ of solvent or per dm$^3$ of reactor volume. The aluminoxane is used in the concentration of from $10^{-4}$ to $10^{-1}$ mole, preferably $10^{-3}$ to $2\times10^{-2}$ mole per dm$^3$ of solvent or per dm$^3$ of reactor volume. In principle, however, higher concentrations are also possible.

It is advantageous to firstly stir the aluminoxane into the polymerization system for a few minutes together with the polymerization liquid phase before adding the metallocene. The stirring time is preferably 10 to 30 minutes. However, shorter stirring times are also possible without suffering to any great extent, and a longer stirring time has no notable effect on the polymerization result.

The polymerization is carried out in an inert solvent which is customary for the low-pressure Ziegler process, for example in an aliphatic or cycloaliphatic hydrocarbon; examples which may be mentioned are butane, pentane, hexane, heptane, isooctane, cyclohexane and methylcyclohexane. In addition, it is possible to use a petroleum or hydrogenated diesel oil fraction which has been carefully freed from oxygen, sulfur compounds and moisture. Toluene can also be used. The monomer to be polymerized is preferably employed as a solvent or suspending agent.

The duration of polymerization is as desired since the catalyst system to be used according to the invention only exhibits a low time-dependent decrease in the polymerization activity.

In the process according to the invention, the use of hydrogen as a molecular weight regulator results in a drastic increase in the catalyst activity. At the same time, the molecular weight can be controlled precisely in the desired range. The molecular weight distribution $M_w/M_n$ here is extremely narrow, with values between 1.8 and 3.0. The use according to the invention of hydrogen at the same time results in a significant reduction in the residual ash content. Using the process according to the invention, a polyolefin wax can be prepared which has a stereoblock structure. Isotactically opposed sequences having a length of 3 or more monomer units alternate in the molecular chains. In general, the chain ends are built up from saturated hydrocarbon groups. At room temperature, stereoblock polymer waxes exist in the form of waxy solids or high-viscosity liquids. The viscosity numbers are in the range from 2 to 60, preferably 4 to 30, in particular 5 to 20, cm$^3$/g.

The examples below are intended to illustrate the invention. In these examples:

EXAMPLE 1

A dry 16 dm$^3$ reactor is flushed with nitrogen and filled with 40 dm$^3$ (s.t.p.)corresponding to 2.5 bar) of hydrogen and with 10 dm$^3$ of liquid propylene. 70 cm$^3$ of a toluene solution of methylaluminoxane (corresponding to 68 mmol of Al, mean degree of oligomerization n=30) were added, and the batch was stirred at 30° C. for 15 minutes.

In parallel, 100 mg (0.176 mmol) of bis-(−)-neomenthylcyclopentadienylzirconium dichloride were dissolved in 35 cm$^3$ of a toluene solution of methylaluminoxane (34 mmol of Al), and the mixture was pre-activated by standing for 15 minutes.

The solution was then introduced into the reactor. The polymerization system was heated to a temperature of 50° C. and then kept at this temperature for 2 hours. 2.45 kg of polypropylene wax were obtained. The activity of the metallocene was thus 7.0 kg of PP wax/mmol of Zr ×h or 12.3 kg of PP wax/g of metallocene ×h.

VN=5.9 cm$^3$/g; $M_w$=2520, $M_n$=1200, $M_w/M_n$=2.1; II=62%, $n_{iso}$=3.0; no unsaturated chain ends.

EXAMPLE 2

The procedure was analogous to Example 1, but 16 dm$^3$ (s.t.p.) (corresponding to 1 bar) of hydrogen were used in place of the 40 dm$^3$ (s.t.p.) (corresponding to 2.5 bar) of hydrogen. 2.20 kg of polypropylene wax were obtained. The activity of the metallocene was thus 6.3 kg of PP wax/mmol of Zr×h or 11.0 kg of PP wax/g of metallocene ×h.

VN =9.8 cm$^3$/g, $M_w$=3260, $M_n$=1600, $M_w/M_n$=2.0; II=60%, $n_{iso}$=3.1; no unsaturated chain ends.

EXAMPLE 3

The procedure was analogous to Example 1, but 4 dm$^3$ (s.t.p.) (corresponding to 0.25 bar) of hydrogen were used in place of the 40 dm$^3$ (s.t p ) (corresponding to 2.5 bar) of hydrogen. 1.98 kg of polypropylene wax were obtained. The activity of the metallocene was thus 5.7 kg of PP wax/mmol of Zr×h or 9.9 kg of PP wax/g of metallocene ×h.

VN=12.4 cm$^3$/g, $M_w$=4760, $M_n$=2150, $M_w/M_n$=2.2;

II=69%, $n_{iso}$=3.5; no unsaturated chain ends.

EXAMPLE 4

The procedure was analogous to Example 1, but the metallocene employed was bis-(neoisomenthylcyclopentadienyl)zirconium dichloride (100 mg, 0.176 mmol). 2.33 kg of polypropylene wax were obtained. The activity of the metallocene was thus 6.7 kg of PP wax/mmol of Zr×h or 11.6 kg of PP wax/g of metallocene ×h.

VN=6.2 cm$^3$/g; $M_w$=2420, $M_n$=1160, $M_w/M_n$=2; II=67%, $n_{iso}$=4.0; no unsaturated chain ends.

EXAMPLE 5

The procedure was analogous to Example 1, but the metallocene employed was bis-(cis-myrtanylcyclopentadienyl)-zirconium dichloride (200 mg, 0.354 mmol). 1.79 kg of polypropylene wax were obtained. The activity of the metallocene was thus 2.5 kg of PP wax/mmol of Zr×h or 4.5 kg of PP wax/g of metallocene ×h.

VN=4.7 cm$^3$/g; $M_w$=1530, $M_n$=875, $M_w/M_n$=1.8; II=58%, $n_{iso}$=3.0; no unsaturated chain ends.

Comparative experiment A

The procedure was analogous to Example 1, but 50 mmol of diethylzinc in 50 cm$^3$ of toluene were metered in in place of the hydrogen. Polypropylene was only formed in traces. The isolated solid was predominantly decomposition products of aluminoxane and of diethylzinc.

Comparative experiment B

The procedure was analogous to Example 1, but no hydrogen was used. 1.10 kg of polypropylene were obtained. The activity of the metallocene was thus 3.1 kg of PP/mmol of Zr×h or 5.5 kg of PP/g of metallocene ×h.

VN=26.2 cm$^3$/g; $M_w$=19,600, $M_n$=8500, $M_w/M_n$=2.3;

II=58%, $n_{iso}$=3.0; one unsaturated chain end per polypropylene chain (determined by $^{13}$C NMR).

We claim:

1. A stereoblock polymer wax comprising units derived from a 1-olefin of the formula RCH=CH$_2$ in which R denotes an alkyl radical having 1 to 28 carbon atoms, having alternating isotactic sequences with an opposed configuration and having a length of 3 or more monomer units in the molecular chain, having saturated chain ends, having a molecular weight distribution $M_w/M_n$ of from 1.8 to 3.0 and having a viscosity number of from 2 to 60 cm$^3$/g.

2. A process for the preparation of a 1-olefin stereoblock polymer wax as claimed in claim 1, by polymerizing a 1-olefin of the formula R—CH=CH$_2$ in which R is an alkyl radical having 1 to 28 carbon atoms, in one or more steps at a temperature of from −50° to 200° C., at a pressure of from 0.5 to 120 bar, in solution, in suspension or in the gas phase, in the presence of a catalyst comprising a transition metal compound and an aluminoxane, which comprises carrying out the polymerization in the presence of a catalyst whose transition metal compound is a metallocene compound of the formula I

in which
R$^1$ and R$^2$ are identical or different and denote a halogen atom, C$_1$–C$_{10}$-alkyl, C$_6$–C$_{10}$-aryl, C$_2$–C$_{10}$alkenyl, C$_7$–C$_{40}$-arylalkyl, C$_7$–C$_{40}$-alkylaryl or C$_8$–C$_{40}$alkenylaryl, R$^3$ and R$^4$ are identical or different and denote a substituted cyclopentadienyl radical, where this radical contains one or more centers of chirality and has been produced by reacting an alkali metal cyclopentadienide with a chiral alcohol, and Me is titanium, zirconium or hafnium, and has been pre-activated before the polymerization for 5 minutes to 60 minutes at a temperature of from −78° to 100° C. using an aluminoxane of the formula II

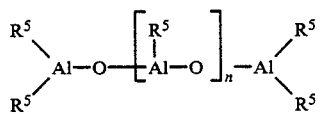

for the linear type or one of the formula III

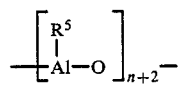

for the cyclic type, where, in the formulae II and III, $R^5$ denotes methyl, ethyl or isobutyl and n is an integer from 5 to 40, and where the activator is likewise an aluminoxane of the formula II or III, and hydrogen is present in the 1-olefin:$H_2$ molar ratio of from 3 to 3000.

3. The process as claimed in claim 2, wherein the 1-olefin is propylene.

4. The process as claimed in claim 2, wherein the metallocene compound is a compound of zirconium.

5. The process as claimed in claim 2, wherein the metallocene compound is bis-(neomenthylcyclopentadienyl)zirconium dichloride, bis-(neoisomenthylcyclopentadienyl)zirconium dichloride or bis-(cis-myrtanylcyclopentadienyl)zirconium dichloride.

* * * * *